United States Patent
Zandifar (10) Patent No.: US 8,379,229 B2
(45) Date of Patent: Feb. 19, 2013

(54) SIMULATION OF A PRINTED DOT-PATTERN BITMAP

(75) Inventor: Ali Zandifar, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 1407 days.

(21) Appl. No.: 12/031,217

(22) Filed: Feb. 14, 2008

(65) Prior Publication Data
US 2009/0207426 A1 Aug. 20, 2009

(51) Int. Cl.
*G06F 3/12* (2006.01)
(52) U.S. Cl. ......... 358/1.1; 382/147; 382/145; 382/144; 382/141; 382/148; 702/35
(58) Field of Classification Search .................. 347/19; 702/35
See application file for complete search history.

(56) References Cited

U.S. PATENT DOCUMENTS

| | | | |
|---|---|---|---|
| 5,138,672 A * | 8/1992 | Hirabayashi et al. | 382/264 |
| 5,586,058 A * | 12/1996 | Aloni et al. | 702/35 |
| 6,261,724 B1 | 7/2001 | Bula et al. | |
| 6,263,299 B1 | 7/2001 | Aleshin et al. | |
| 6,674,889 B1 * | 1/2004 | Takayama | 382/149 |
| 6,834,262 B1 | 12/2004 | Balasinski et al. | |
| 6,996,281 B2 * | 2/2006 | Boliek et al. | 382/236 |
| 7,117,138 B2 | 10/2006 | Yu et al. | |
| 7,315,363 B2 * | 1/2008 | Hamamatsu et al. | 356/237.2 |
| 7,646,906 B2 * | 1/2010 | Saidin et al. | 382/144 |
| 2006/0158478 A1 | 7/2006 | Howarth et al. | |

* cited by examiner

*Primary Examiner* — Benny Q Tieu
*Assistant Examiner* — Paul F Payer (57) ABSTRACT

Embodiments of the present invention enable generation of a simulated reference bitmap image that corresponds to a dot-pattern image. Certain applications of the present invention are its use in various embodiments of a system for inspection of a printed circuit board ("PCB") substrate. In embodiments, a dot-pattern image and user-input configuration parameters are used to create an initialized simulated reference bitmap, and the dot pattern is mapped onto the reference bitmap using a scaling factor. In embodiments, reference bitmaps of individual sections of a dot-pattern image may be generated separately.

20 Claims, 11 Drawing Sheets

Map a dot in the dot-pattern image to a pixel in the simulated reference bitmap — 505

↓

Use the droplet diameter size to simulate a circle around the mapped pixel — 510

```
┌─────────────────────────────────────┐
│ Divide a dot-pattern bitmap image into │
│ sections, each section having a specified size │──── 705
└─────────────────────────────────────┘
                  ↓
┌─────────────────────────────────────┐
│ Create white pixel borders on the dot-pattern │
│         image, if needed             │──── 710
└─────────────────────────────────────┘
                  ↓
┌─────────────────────────────────────┐
│ Use the scaling factor between the dot- │
│ pattern image and the simulated reference │
│ bitmap to compute an initialized simulated │──── 715
│   reference bitmap image section      │
└─────────────────────────────────────┘
                  ↓
┌─────────────────────────────────────┐
│ Map each dot-pattern image section to its │
│ corresponding simulated reference bitmap │──── 720
│              section                  │
└─────────────────────────────────────┘
```

SIMULATION OF A PRINTED DOT-PATTERN BITMAP

BACKGROUND

A. Technical Field

The present invention pertains generally to image processing, and relates more particularly to systems and methods for simulation of a printed dot-pattern bitmap image.

B. Background of the Invention

Printing technology is an important component of applications such as printed circuit board (hereafter, "PCB") manufacturing. In PCB manufacturing, a PCB pattern image may be printed directly onto a PCB substrate. It is important that the PCB image is accurate, because errors or aberrations in the image may result in errors in the manufactured PCB substrate.

Typically, a PCB pattern is printed as a dot-pattern image by an industrial inkjet printer. It is important to be able to calibrate such printers as well as perform quality control in order to insure that their printing performance is consistent and meets specifications. An inkjet printer head contains a set of nozzles, and the output of a particular nozzle may be correlated to regions of the dot-pattern image being printed. After periods of printer continuous use, a nozzle may become clogged or otherwise malfunction and this could lead to errors or aberrations in the image being printed.

Ceramic PCB substrates with a pattern printed by industrial inkjet printers typically are cured between successive printing cycles by a baking process. The presence of surface contaminants and the act of curing may result in the distortion of printed features. In addition to uniform shrinkage, the printed pattern is also subject to non-uniform shrinkage based on the local geometry of printed material. Distortions in the printed pattern and misfiring ink jet nozzles may also create circuit errors such as open and short circuits (topological distortions), and misalignment of circuit features (geometric distortions) between multiple printing passes.

If a nozzle's "signature" can be characterized in terms of the quality of its rendering of a region of a dot pattern, a malfunctioning printer and the cause of the malfunction could be identified through inspection of the images it produces. It would be useful to be able to identify and correct printing errors resulting from a malfunctioning printer before more costly manufacturing errors are incurred.

SUMMARY OF THE INVENTION

Embodiments of the present invention enable generation of a simulated reference bitmap image that corresponds to a dot-pattern image. Certain applications of the present invention are its use in various embodiments of a system for inspection of a printed circuit board ("PCB") substrate. In embodiments, a dot-pattern image and user-input configuration parameters are used to create an initialized simulated reference bitmap, and the dot pattern is mapped onto the reference bitmap using a scaling factor. In embodiments, reference bitmaps of individual sections of a dot-pattern image may be generated separately.

In embodiments, a method for simulating a reference bitmap image may comprise defining a plurality of reference bitmap image characteristics using a set of user-input parameters; computing a scaling factor based at least in part on a comparison of at least one characteristic within the plurality of reference bitmap image characteristics at least one dot-pattern bitmap characteristic; generating an initialized reference bitmap image based on the plurality of reference bitmap image characteristics and the scaling factor; mapping a dot-pattern image within the initialized reference bitmap image that results in the reference bitmap image; and smoothing at least one edge and at least one color intensity within the reference bitmap image.

In embodiments, the step of defining the plurality of reference bitmap image characteristics may comprise computing a width and a height of the initialized reference bitmap image; computing a first quantity of pixels within a row of the initialized bitmap image; computing a second quantity of pixels within a column of the initialized reference bitmap image; computing a size of a pixel within the initialized reference bitmap image; and computing a droplet size associated with the initialized reference bitmap image. In embodiments, the droplet size is defined as a ratio of a droplet within the reference bitmap image and the size of the pixel.

In embodiments, the step of mapping a dot-pattern image within the initialized reference bitmap image may comprise mapping a plurality of dots within the dot-pattern image to a corresponding plurality of pixel locations within the initialized reference bitmap image; and defining a size for each of the dots mapped within the initialized reference bitmap image according the computed droplet size.

In embodiments, the step of smoothing at least one edge and at least one color intensity may comprise applying a low pass filter to the reference bitmap image; and binarizing the reference bitmap image by comparing intensity values of pixels within the reference bitmap image to a threshold value. In embodiments, the low-pass filter is a Gaussian filter. In embodiments, the step of binarizing the reference bitmap image may comprise assigning a maximum intensity value to a pixel if the intensity value of the pixel is greater than the threshold value; and assigning a minimum intensity value to a pixel if the intensity value of the pixel is less than the threshold value.

In embodiments, a method for generating a reference bitmap image corresponding to a section of a dot-pattern image may comprise separating a dot-pattern image into a plurality of dot-pattern image sections; defining a first size of a first section within the plurality of dot-pattern image sections; mapping the first section within the plurality of dot-pattern image sections to a first initialized reference bitmap image; defining a second size of a second section within the plurality of dot-pattern image sections; mapping the second section within the plurality of dot-pattern image sections to a second initialized reference bitmap image; and wherein a first border of the first initialized reference bitmap image overlaps with a second border of a second initialized reference bitmap image.

In embodiments, the step of mapping a section within the plurality of dot-pattern image sections to an initialized reference bitmap image may comprise mapping a plurality of dots within the section to a corresponding plurality of pixel locations within the initialized reference bitmap image; and defining a size for each of the dots mapped within the initialized reference bitmap image according to a computed droplet size.

In embodiments, a size of an initialized reference bitmap section comprises a plurality of rows of pixels and a plurality of columns of pixels. In embodiments, the step of defining a size of a section within the plurality of dot-pattern image sections comprises identifying a set of rows of pixels, the set of rows having a size equal to a difference between a first number of rows of pixels within the dot-pattern image section and a second number of rows of pixels within the initialized reference bitmap; identifying a set of columns of pixels, the set of columns having a size equal to a difference between a first number of columns within the dot-pattern image section and a second number of columns of pixels within the initialized reference bitmap; adding a first padding border containing the set of rows of pixels to the dot-pattern image section if the set of rows of pixels has at least one row; and adding a second padding border containing the set of columns of pixels to the dot-pattern image section if the set of columns of pixels has at least one column.

In embodiments, a method for generating a reference bitmap image corresponding to a section of a dot-pattern image may further comprise removing the first padding border from the reference bitmap image if the dot-pattern image section has the first padding border; and removing the second padding border from the reference bitmap image if the dot-pattern image section has the second padding border.

In embodiments, a system for simulating a reference bitmap image may comprise a reference bitmap initialize that creates an initialized reference bitmap image; and a reference bitmap builder that maps the dot-pattern image into the initialized reference bitmap image based at least in part on a scaling factor, location relationship between a plurality of dots within the dot-pattern image and a plurality of pixels within the initialized reference bitmap image, and a computed droplet size.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

Figure 1A:
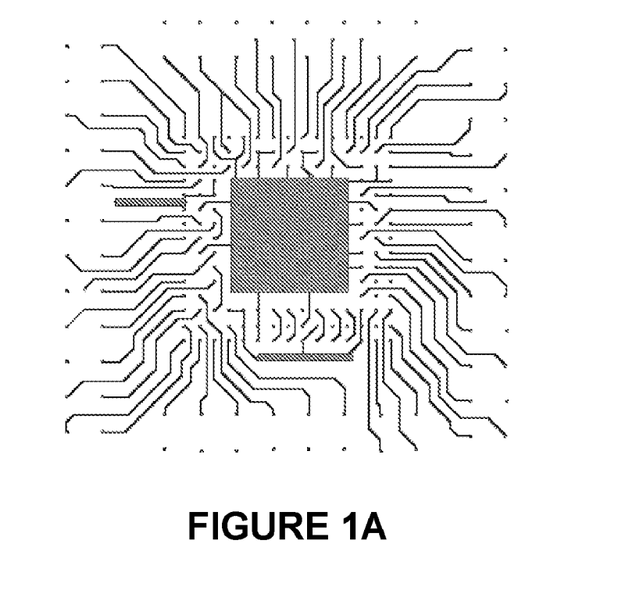
FIG. 1A illustrates an example of a PCB dot-pattern bitmap image according to various embodiments of the invention.

Certain applications of the present invention are its use in various embodiments of a system for inspection of a printed circuit board ("PCB") substrate. FIG. 1A illustrates an exemplary PCB pattern image. A PCB pattern may be printed onto a substrate as a dot-pattern image by an industrial ink jet printer; the dot pattern is produced by an array of printer ink nozzles. After some period of continuous use of an ink jet printer, some of its nozzles may become clogged and this may lead to aberrations in the dot-pattern image being printed. An aberration in a printed PCB pattern may correspond to a circuit defect such as a short or a broken connection.

In embodiments, an inspection system may be applied to PCB images that have been printed by an ink jet printer. Such an inspection system may enable identification of faults in a printed PCB image and also may enable determination of which nozzles were associated with the locations of the identified faults on the printed image.

Figure 1B:
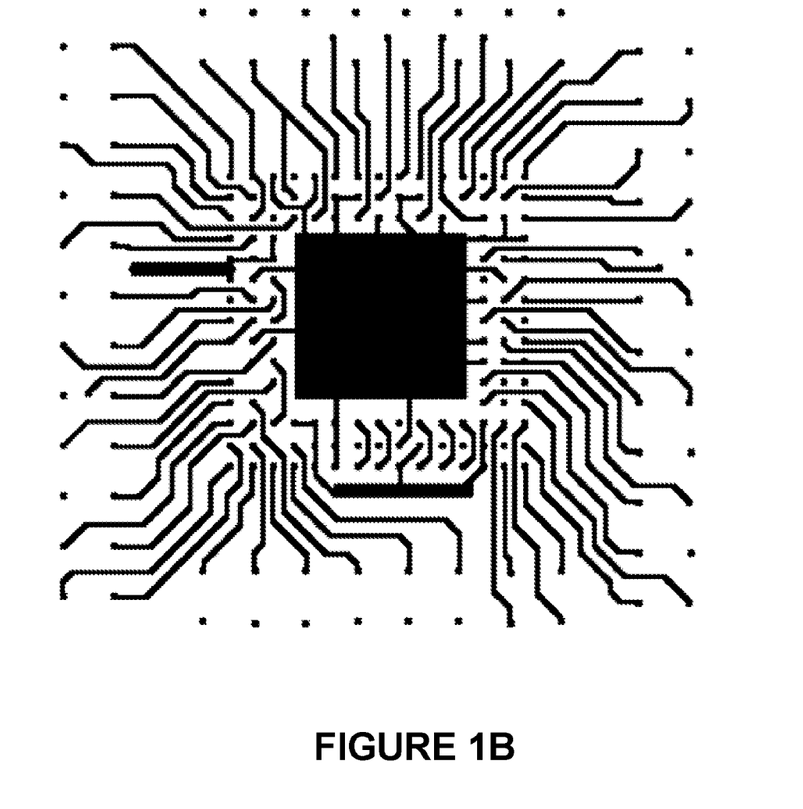
FIG. 1B illustrates an example of a generated reference bitmap image of a PCB dot-pattern image according to various embodiments of the invention.
Figure 2A:
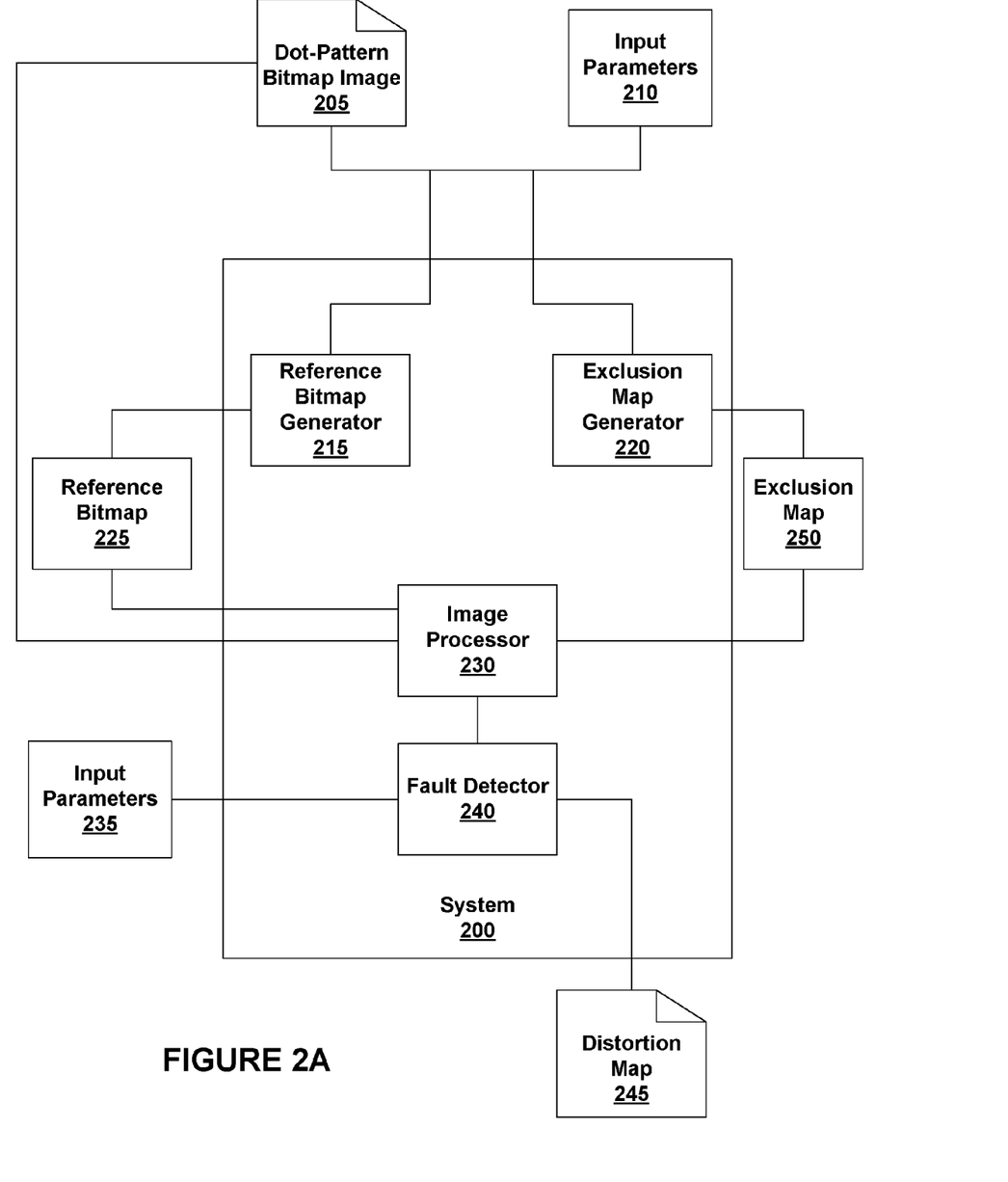
FIG. 2A depicts a block diagram of a system for inspection of a printed PCB bitmap according to various embodiments of the invention.

FIG. 2A depicts a block diagram of a system 200 for inspection of a printed dot-pattern image according to various embodiments of the invention. System 200 receives a dot-pattern bitmap image to be inspected 205 and compares it to a simulated reference bitmap image 225 that is generated by a reference bitmap generator 215. FIG. 1B depicts an exemplary simulated reference bitmap that was generated from the dot-pattern image illustrated in FIG. 1A. In embodiments, the reference bitmap is larger in size than the dot-pattern image on which it is based in order to increase the resolution of the reference image. The size and configuration of the generated reference bitmap may be determined by user-input parameters 210.

In embodiments, the dot-pattern image 205 and the reference bitmap image 225 are compared by an image processor 230. A fault detector 240, configurable by user-input parameters 235, creates a distortion map 245 of aberrations that may have been discovered during the comparison of the input image 205 with the generated reference image 225.

The input dot-pattern bitmap image 205 may be very large. In embodiments, large dot-pattern bitmap images may be divided into sections and then selected sections may be compared with corresponding sections of the generated reference bitmap image. In embodiments, sections to be compared may be selected through user-input parameters 210. An "exclusion map" 250 of the dot-pattern image that is generated by an exclusion map generator 220 may be used in the selection of sections to compare. An exclusion map identifies areas of non-inspection within a dot-pattern image.

A. System Implementations

Figure 2B:
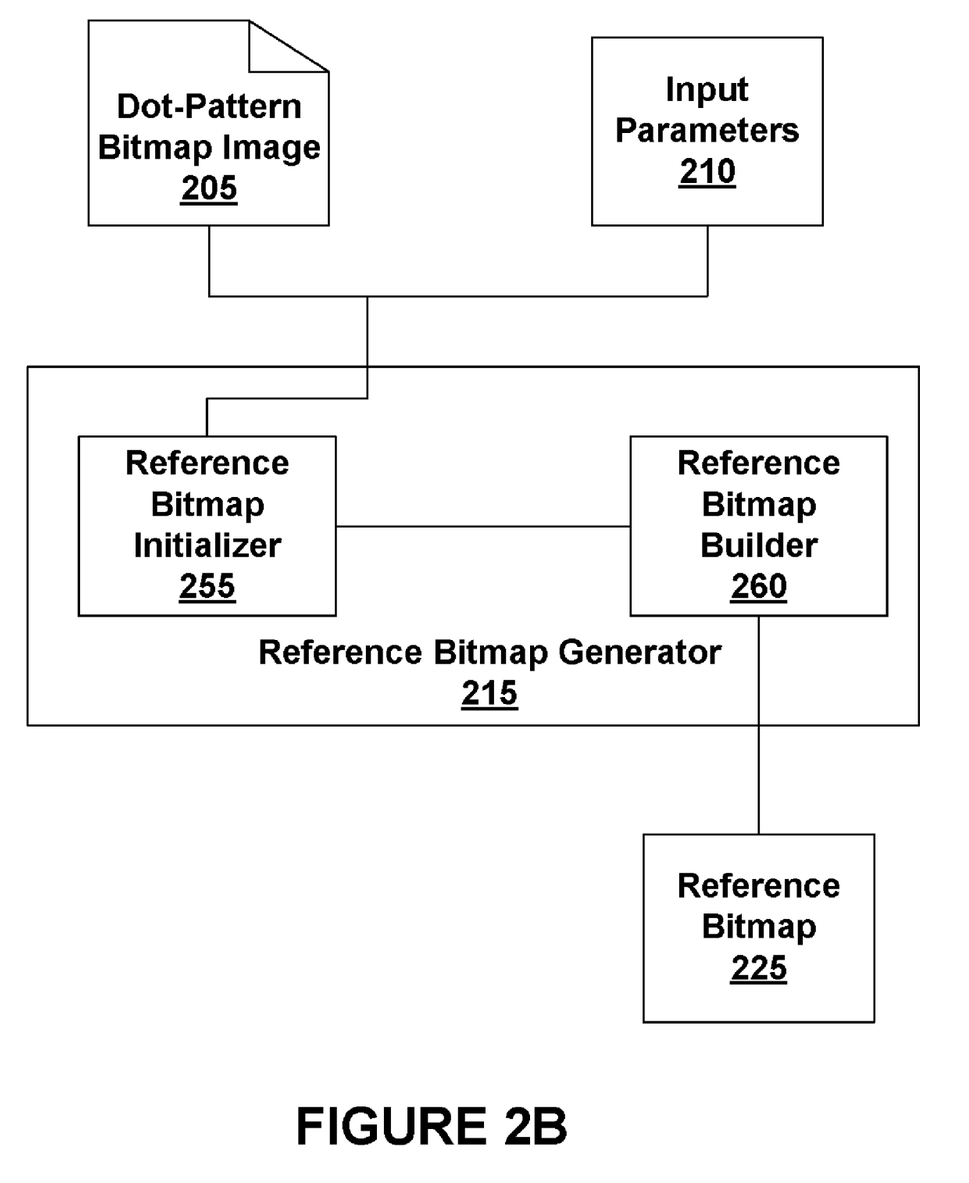
FIG. 2B depicts a block diagram of a system for generating a reference dot-pattern bitmap according to various embodiments of the invention.

FIG. 2B depicts a block diagram of a reference bitmap generator 215 according to various embodiments of the invention. Reference bitmap generator 215 receives a dot-pattern bitmap image 205 and user-input parameters 210 and generates a simulated reference bitmap 225 that represents a preferred rendering of the dot-pattern bitmap image 205. A reference bitmap 225 may be used in embodiments of inspection system 200 for comparison with a dot-pattern bitmap image 205 in order to identify faults within dot-pattern bitmap image 205.

In embodiments, reference bitmap initializer 255 receives a dot-pattern bitmap image and user-input parameters 210, and generates an initialized reference bitmap image with a specified configuration. As previously discussed for the examples illustrated in FIGS. 1A and 1B, the generated reference bitmap may have a different size and configuration from the size and configuration of the dot-pattern image on which it is based. An inkjet printer nozzle renders a dot as a "droplet" of ink that has an ideal circular shape. In embodiments, user-input parameters 210 may comprise printer pitch as dots-per-inch (DPI) in the x and y directions, printer droplet size in microns, and the DPI of the simulated pattern that will be produced. The input parameters are used to compute the configuration parameters for the reference bitmap to be generated. In embodiments, an initialized reference bitmap image is generated using the computed configuration parameters; all of the pixels in the initialized reference bitmap image are assigned the same intensity value.

In embodiments, reference bitmap builder 260 uses the configuration parameters and a scaling factor to map the dot pattern image onto the initialized reference bitmap image.

B. Methods for Generating a Reference Bitmap Image

Figure 3:
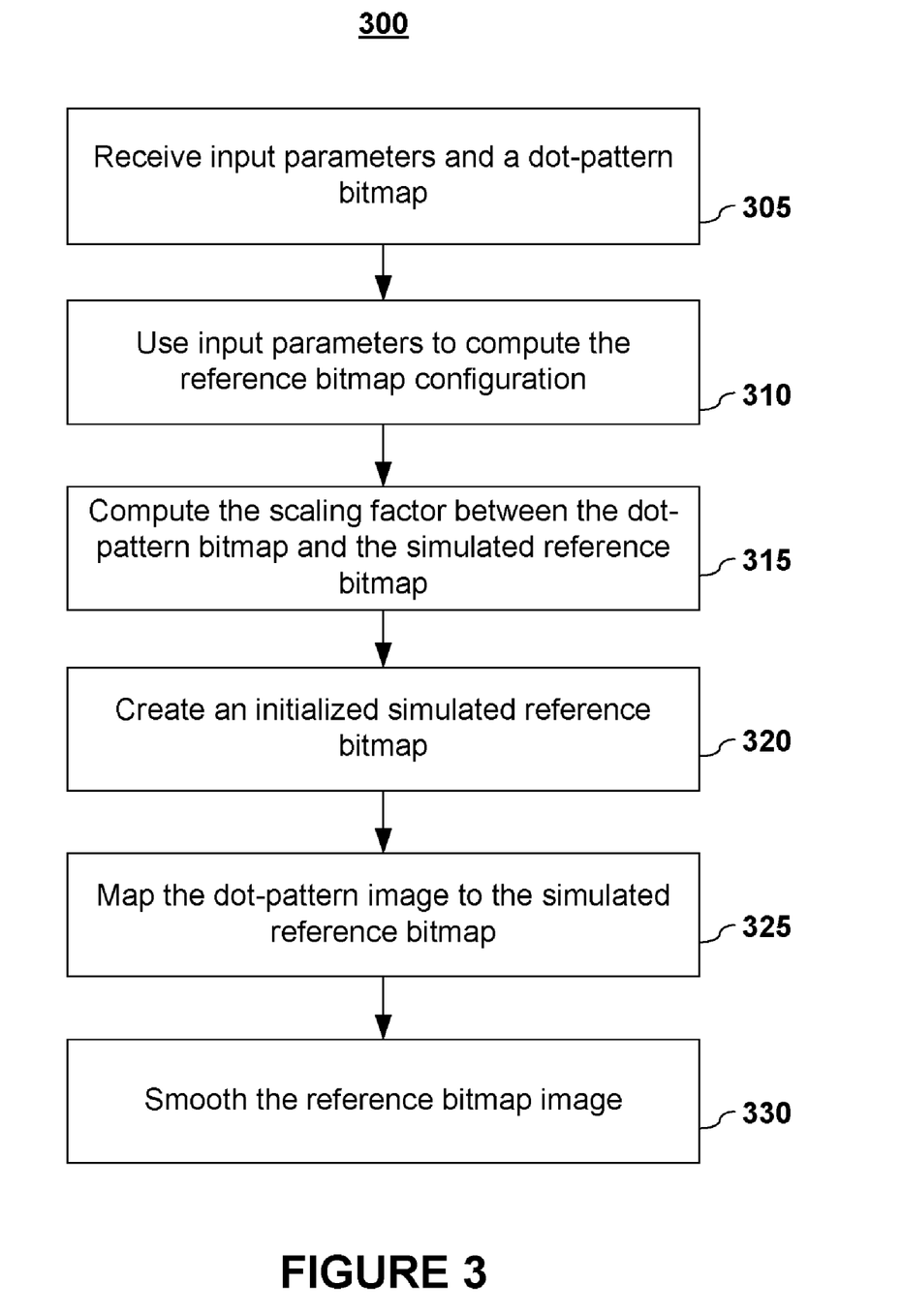
FIG. 3 depicts a method for generating a reference bitmap image according to various embodiments of the invention.

FIG. 3 depicts a method 300, independent of structure, for generating a reference bitmap image according to various embodiments of the invention. Method 300 may be implemented in embodiments of reference bitmap generator 215 of system 200.

In embodiments, a reference bitmap with a specified configuration is generated from a dot-pattern bitmap image and user-input parameters 305. As previously discussed for the examples illustrated in FIGS. 1A and 1B, the generated reference bitmap may have a different size and configuration from the size and configuration of the dot-pattern image on which it is based. In embodiments, user-input parameters affecting the size and configuration of the generated reference bitmap may comprise printer pitch as dots-per-inch (DPI) in the x and y directions, printer droplet size in microns (an inkjet printer nozzle renders a dot as a "droplet" of ink that has an ideal circular shape), and the DPI of the simulated pattern that will be produced.

The input parameters are used to compute configuration parameters for the reference bitmap to be generated 310. A scaling factor is computed that relates configuration parameters of the dot-pattern image to configuration parameters of the reference bitmap image, if necessary 315. In embodiments, an initialized reference bitmap image is generated using the computed configuration parameters; all of the pixels in the initialized reference bitmap image are assigned the same intensity value 320.

In embodiments, the dots of the dot-pattern image are mapped onto the initialized reference bitmap using the configuration parameters 325. The edges and color of the reference bitmap dot pattern are smoothed 330.

1. Computation of Configuration Parameters

Figure 4:
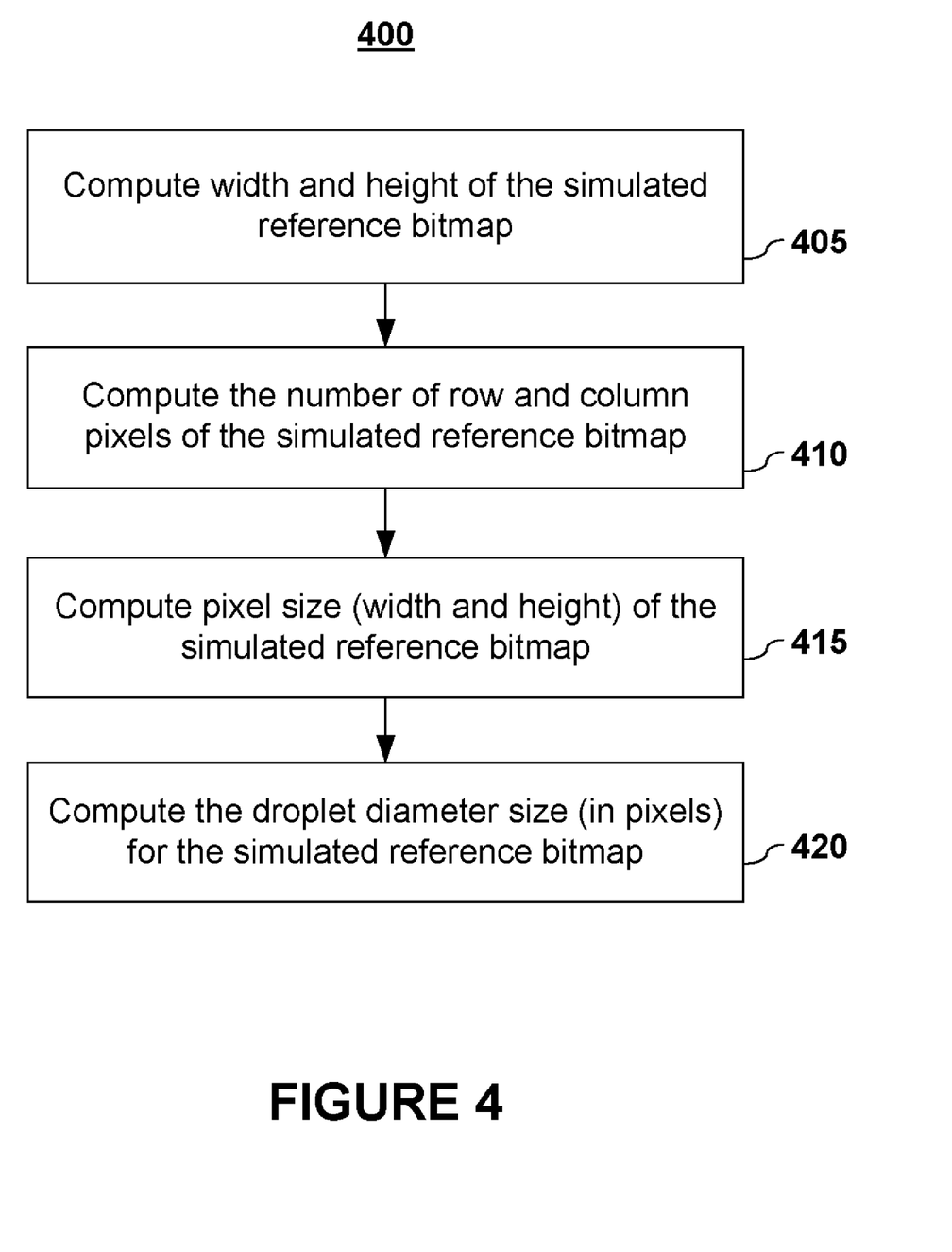
FIG. 4 depicts a method for using input parameters to compute the configuration of a reference bitmap image according to various embodiments of the invention.

FIG. 4 depicts a set of configuration parameter computations 400 according to various embodiments of the invention. The set of configuration parameter computations may comprise the computations of step 310 in embodiments of method 300.

Computed configuration parameters of the reference bitmap image may comprise the width and height of the image 405; the number of pixels in a row and in a column of the image 410; the pixel size (width and height) 415; and the droplet diameter size ("Rp") 420. For example, an Rp of 3 pixels is computed for an image in which a printer droplet is 30 microns in diameter and a pixel has a size of 7 microns. Those skilled in the art will recognize that a variety of configuration parameters exist, all of which may be used within embodiments of the invention.

2. Generating the Reference Dot Pattern

Figure 5:
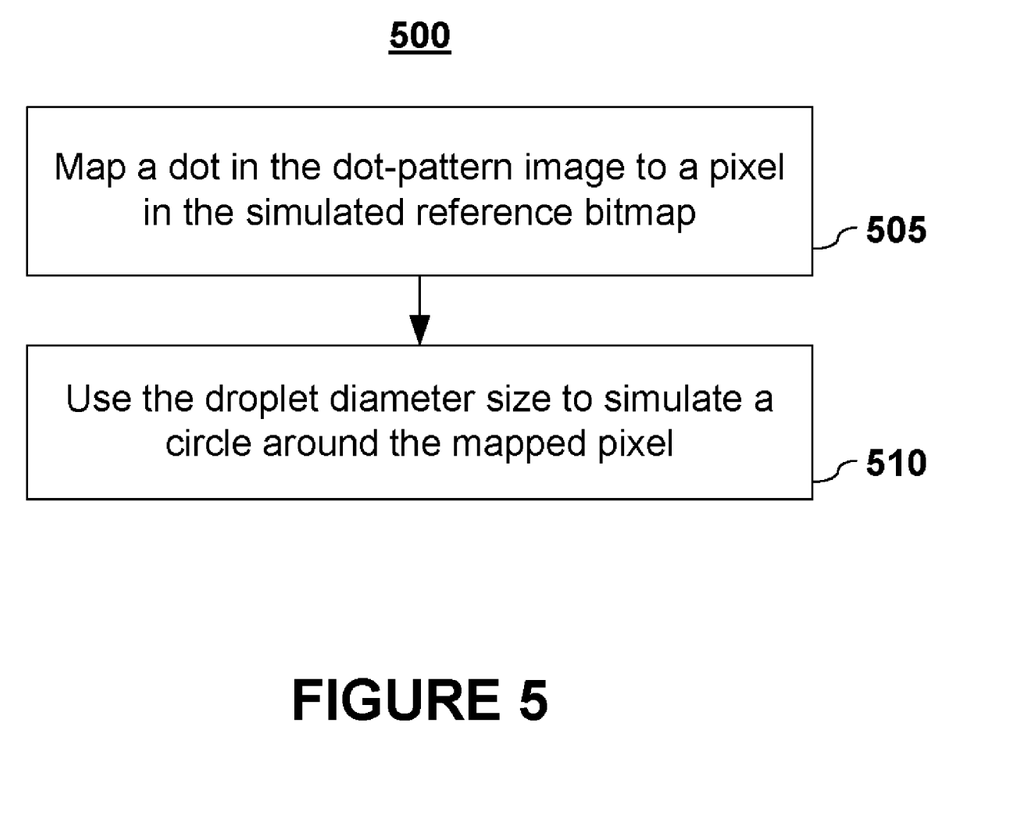
FIG. 5 depicts a method for mapping a dot-pattern image to a reference bitmap according to various embodiments of the invention.

FIG. 5 depicts a method 500, independent of structure, for mapping a dot pattern onto an initialized reference bitmap according to various embodiments of the invention. Method 500 may be implemented as step 325 in embodiments of method 300.

The location (x and y co-ordinates) of a dot in the dot-pattern image is mapped to a pixel at a corresponding location on the reference bitmap using the computed scaling factor, if necessary 505. A circle having the mapped pixel at its center and with a computed radius is generated on the reference bitmap 510. In various embodiments, the computed Rp is used as the value of the radius.

Figure 6:
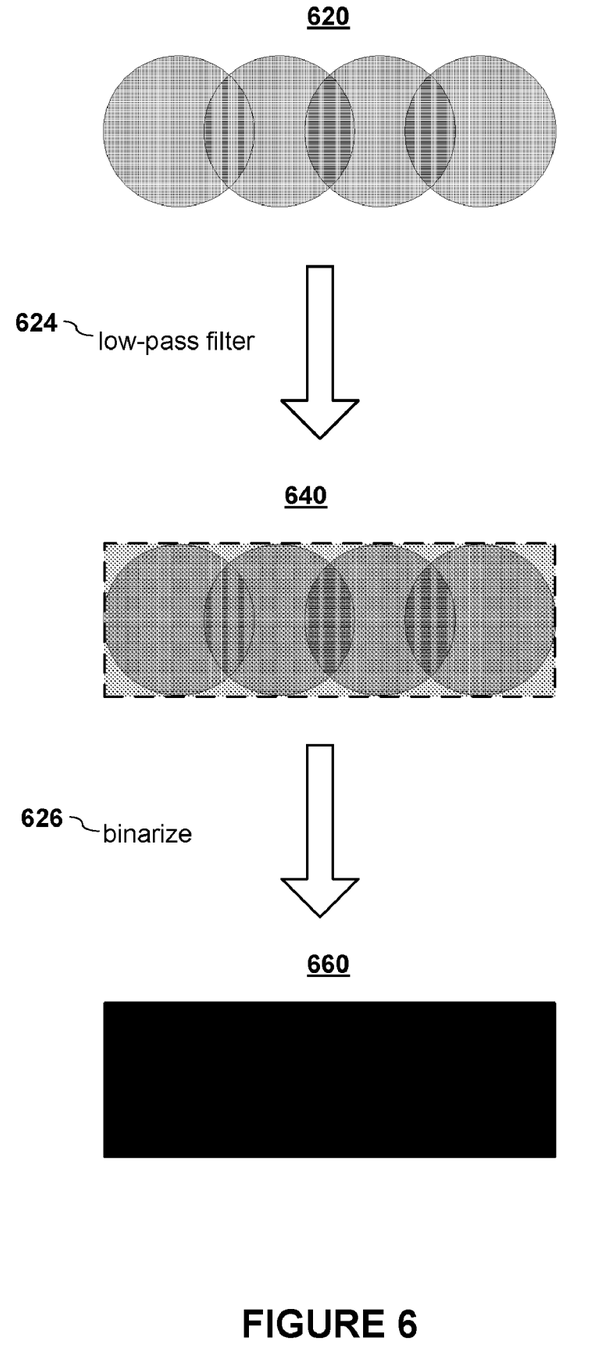
FIG. 6 illustrates an example of smoothing a reference bitmap image according to various embodiments of the invention.

FIG. 6 illustrates an example of smoothing the reference bitmap according to various embodiments of step 330 in method 300. The generated circles from a line section of a mapped dot pattern 620 may overlap so that the generated line has irregularities on both its edge boundaries and its color. A low-pass filter 624 such as a Gaussian filter may be applied to the intensities of the pixels on the edges in order to smooth the edges of the rendered line 640 by increasing the intensity resolution on the edges. The image color may be smoothed by binarizing 626 the pixel intensities using a relatively large threshold value. Binarizing pixel intensities removes certain shades of gray from an image by setting pixel intensity values above a threshold value to black (intensity value of 0) and setting pixel intensity values below the threshold value to white (intensity value of 255). The side effects of the dot pattern generation process are removed after smoothing, so that the generated reference bitmap line image 660 represents its corresponding line on the dot-pattern image. Those skilled in the art will recognize that a variety of smoothing techniques exist and that the selection, configuration, and application method of particular smoothing techniques is not critical to the invention.

C. Methods for Generating a Reference Bitmap for Large Dot-Pattern Images

As was previously discussed for the examples illustrated in FIGS. 1A and 1B, the reference bitmap that is generated for a corresponding dot-pattern image may be scaled to be larger in size in order to improve the resolution of the generated image. When the dot-pattern image is large (a printed PCB image intended for a large substrate, for example), the scaled up size of its corresponding generated reference image may excessively consume computing resources such as memory. In various embodiments of the invention, a dot-pattern image is divided into sections and a separate reference bitmap is generated for a selected section using an embodiment of method 300.

Figure 7:
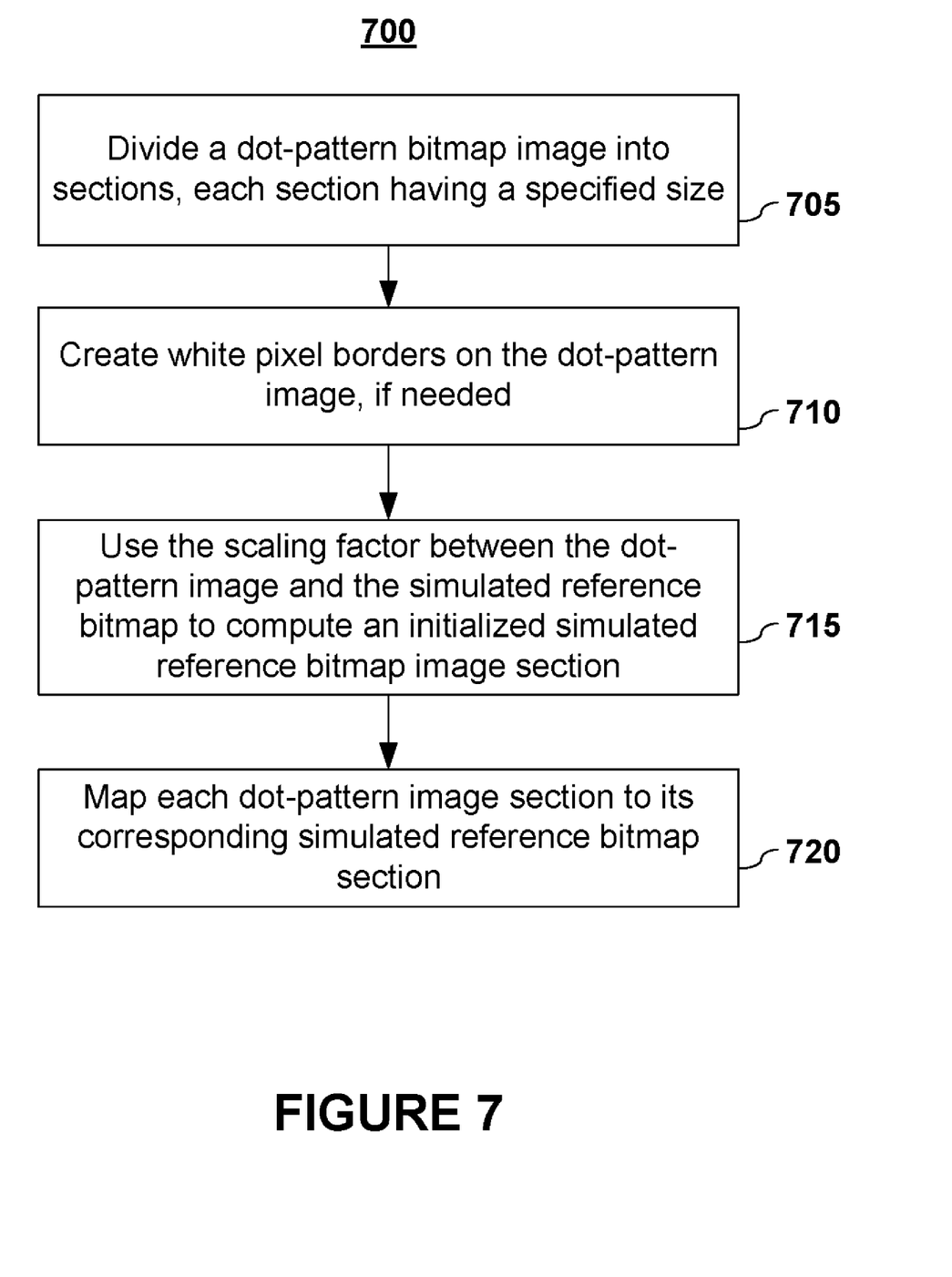
FIG. 7 depicts a method for generating a reference bitmap image comprised of sections of a dot-pattern image according to various embodiments of the invention.

FIG. 7 depicts a method 700, independent of structure, for generating a reference bitmap image comprised of sections corresponding to sections of a dot-pattern image according to various embodiments of the invention.

A large dot-pattern bitmap is divided into sections 705. In various embodiments of the invention, the size of a section is specified by user-input parameters that specify the pixel density of the section. In embodiments, pixel density of a section may be specified by the number of rows in the section and the number of pixels in a column of the section (for example, a section may contain 1000 rows and 1000 columns). In embodiments, selection of the size of a section may be based on attributes such as the amount of memory available and the computed scaling factor between the dot-pattern image and its corresponding reference bitmap to be generated. Those skilled in the art will recognize that a variety of attributes exist and that the choice of attributes on which to base the selection of section size is not critical to the invention.

Figure 8:
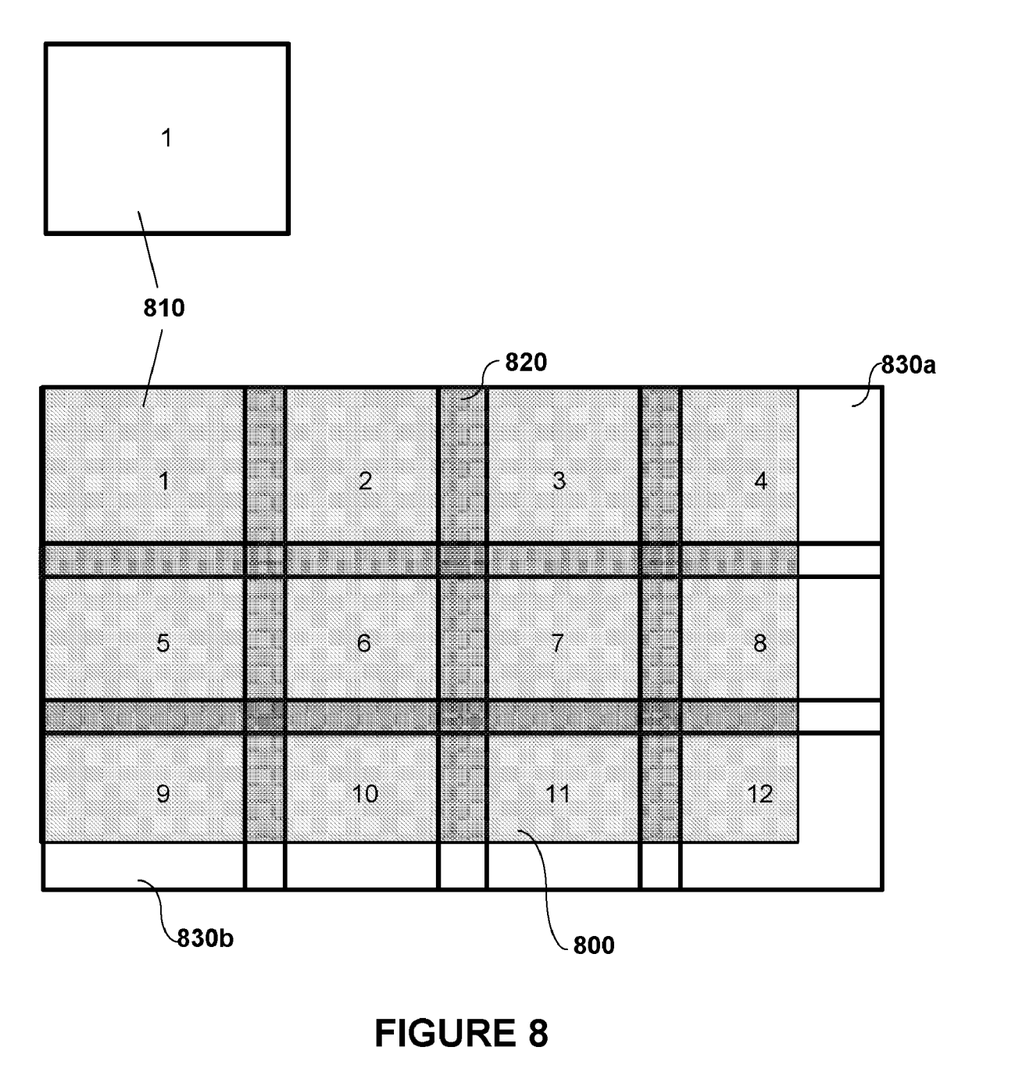
FIG. 8 illustrates an example of a large dot-pattern image overlaid by a set of sections according to various embodiments of the invention.

FIG. 8 illustrates an example of a dot-pattern image 800 overlaid by a set of twelve sections according to various embodiments of the invention. In this example, each section 810 is mapped to a corresponding location on the image 800 so that the entire image may be represented if the set of sections is stitched together. In various embodiments of the invention, there is overlap 820 at the boundaries of adjacent sections in order to mitigate distortion of the dot pattern that is mapped at those locations. As shown in this figure, the top left corner of the dot-pattern image is aligned with the top left corner of the first section 810. The overlap 820 is determined by assigning the top right corner of an adjacent section to a location within the boundary of its neighboring section. In various embodiments, the amount of overlap expressed in number of pixels may be determined by, for example, droplet size (the number of pixels overlapping should be larger than Rp), pixel density in the image, and complexity of the image. Those skilled in the art will recognize that a variety of attributes may be used to determine the amount of overlap and that the selection of attributes is not critical to the invention.

In various embodiments, an overlapping section having a location corresponding to the right edge or bottom edge of the dot-pattern image may extend beyond the edge of the image because of the selected section size. The dot-pattern image may be extended by assigning an additional white border (830a and 830b) on the edges to correspond to the section extensions 710.

In various embodiments, the user-input parameters, computed configuration parameters, and scaling factor are used to determine the number and location of the set of generated sections that will represent the entire dot-pattern image 715. The dot pattern is mapped onto an initialized section from its corresponding location on the dot-pattern image 720 using an embodiment of method 300. User-input parameters may be used to determine whether all or a subset of the set of sections are generated.

1. Generating a Reference Bitmap of a Dot-Pattern Image Section

Figure 9:
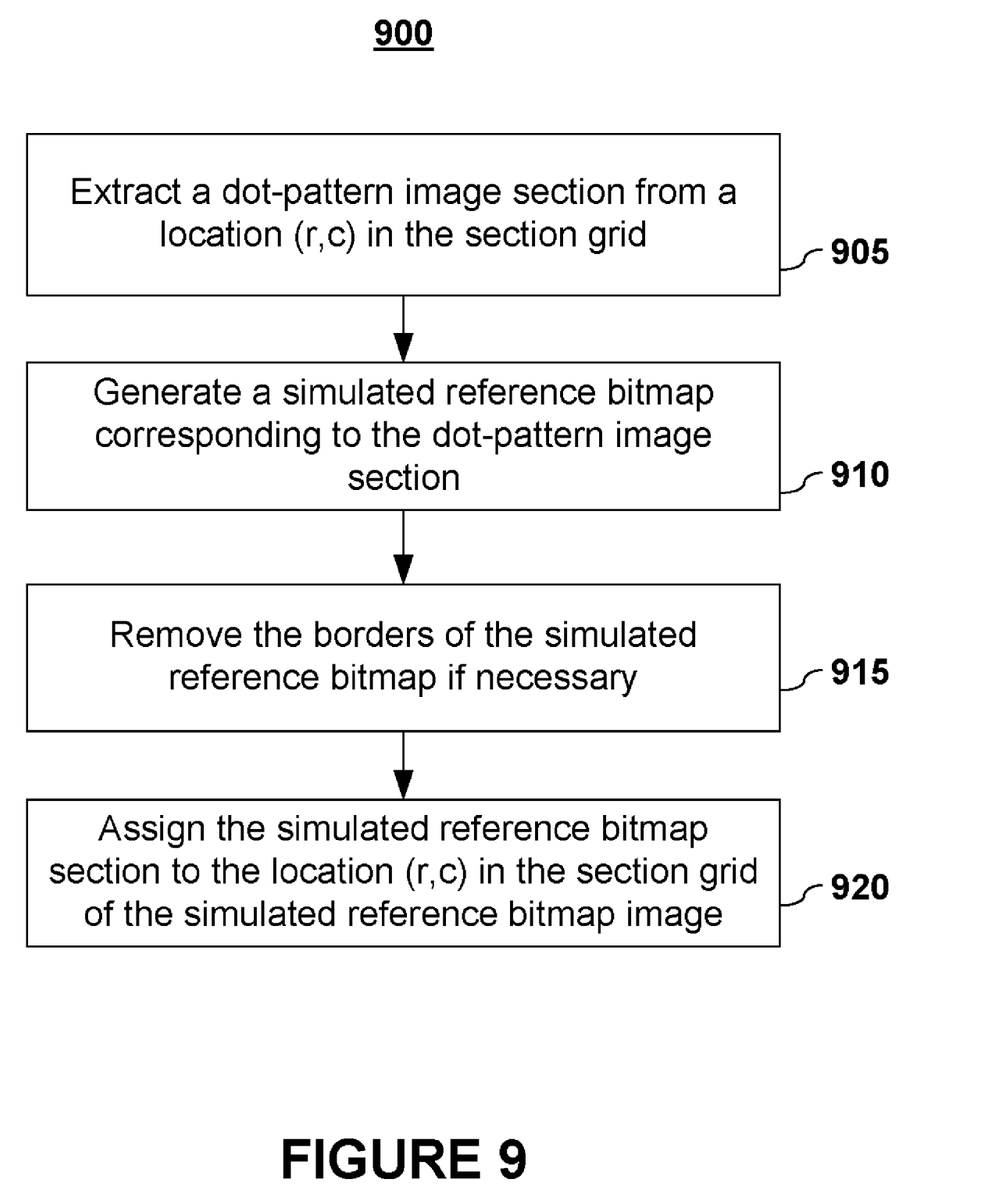
FIG. 9 depicts a method for mapping a dot-pattern image section to its corresponding reference bitmap section according to various embodiments of the invention.

FIG. 9 depicts a method 900, independent of structure, for generating a reference bitmap corresponding to a section of a dot-pattern image according to various embodiments of the invention. Method 900 may be implemented as step 720 in embodiments of method 700.

An embodiment of method 300 may be used to generate a reference bitmap 910 corresponding to the dot-pattern image section 905. If an image section includes a white pixel border as illustrated in 830a and 830b of FIG. 8, the portion of the generated reference bitmap corresponding to the border is removed 915. In embodiments, the generated reference bitmap may be assigned to a location within a reference bitmap image corresponding to the location of the selected section within the dot-pattern image 920, enabling a reference bitmap of a large dot-pattern image to be constructed from a set of separately simulated sections.

D. Computing System Implementation

It shall be noted that the present invention may be implemented in any instruction-execution/computing device or system capable of processing the data, including without limitation, a general-purpose computer and a specific computer, such as one intended for data processing. The present invention may also be implemented into other computing devices and systems, including without limitation, a digital camera, a printer, a scanner, a multiple function printer/scanner, a facsimile machine, a multimedia device, and any other device that processes, captures, transmits, or stores data. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
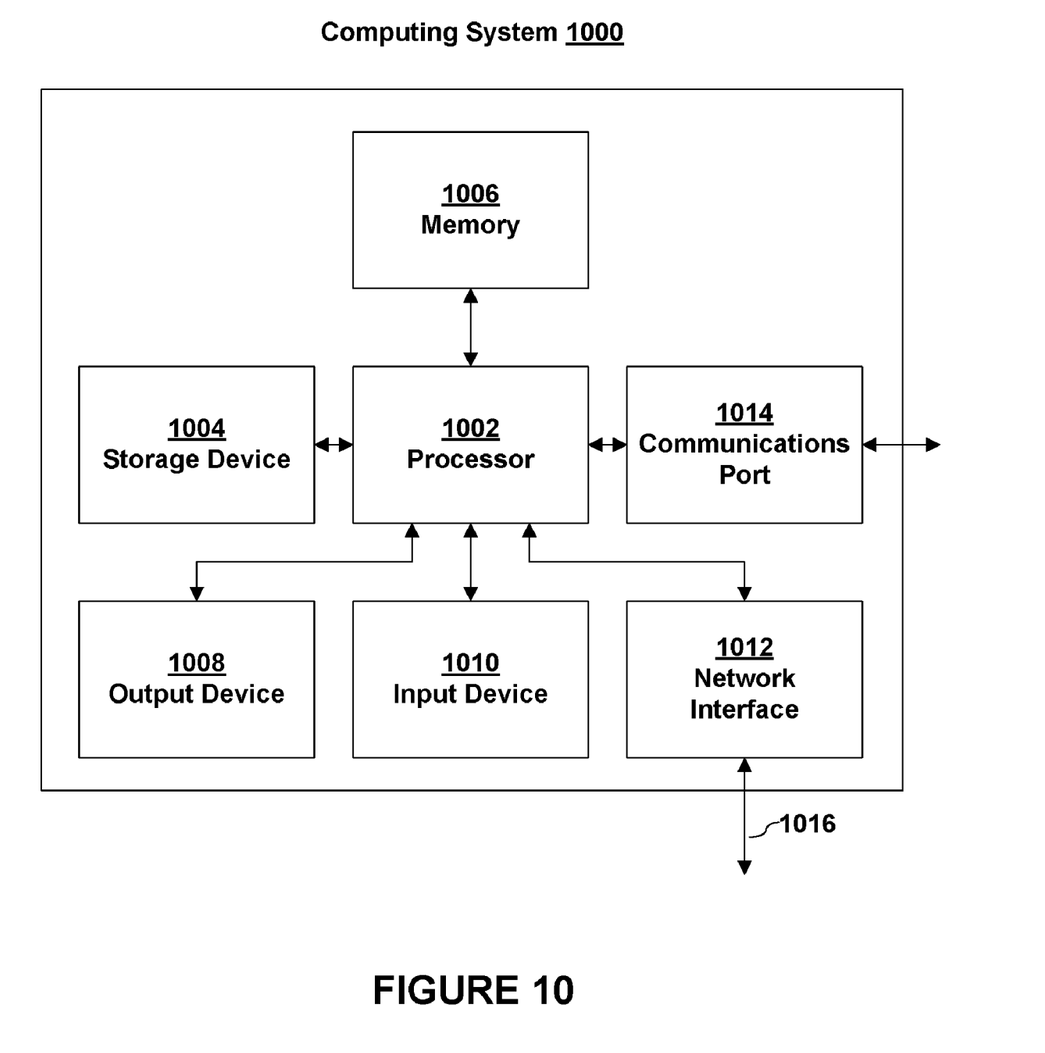
FIG. 10 depicts a block diagram of a computing system.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as an AMD processor, an INTEL x86 processor, a SUN MICROSYSTEMS SPARC, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a computer-readable media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIGS. 2A and 2B may be modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for simulating an inkjet-printed image, the method comprising:
   accessing a dot-pattern bitmap image;
   determining simulated ink droplet locations within an initialized image in accordance with the dot-pattern bitmap image;
   defining a simulated ink droplet within said initialized image corresponding to each dot of said dot-pattern bitmap image, each simulated ink droplet having a circular pattern and a common intensity, wherein the circular patterns of simulated ink droplets corresponding to adjacent dots of said dot-pattern bitmap overlap each other and have center points offset from each other;
   mapping each dot of the dot-pattern bitmap to the center point of its corresponding simulated droplet location;
   applying an intensity smoothing filter to said circular patterns to produce a smooth initialized image; and
   binarizing the intensity of said smooth initialized image.

2. The method of claim 1, wherein said common intensity is a common color intensity.

3. The method of claim 1, wherein said circular patterns have an ideal circular shape.

4. The method of claim 3, wherein said circular patterns have a common radius size.

5. The method of claim 2, further including smoothing the edges of the simulated inkjet-printed image.

6. The method of claim 1, wherein said smoothing filter is a Gaussian filter.

7. The method of claim 1, wherein the binarizing of the intensity of said smooth initialized image includes:
   changing to a first predefined value the intensity of pixels of the smooth initialized image whose value is below a predefined threshold, and changing to a second predefined value the intensity of the pixels of the smooth uninitialized image whose value is above the predefined threshold.

8. The method of claim 7, wherein said first predefined value is the maximum available intensity and said second predefine value is the minimum available intensity.

9. The method of claim 1, further including:
   determining a scaling factor for said simulated inkjet-printed image from user-provided input parameters;
   wherein said dot-pattern bitmap is further mapped to said simulated inkjet-printed image in accordance with said scaling factor.

10. The method of claim 9, wherein said user-provided input parameters include a printer pitch as dots-per-inch (DPI), a printer droplet size, and the desired DPI of the simulated inkjet-printed image.

11. The method of claim 10, wherein the printer pitch is given in the x and y direction.

12. The method of claim 1, wherein said simulated inkjet-printed image simulates a printed circuit board, (i.e. a printed PCB), image printed by an inkjet printer.

13. The method of claim 12, wherein:
said inkjet printer contains an inkjet printer head containing a set of nozzles, and the output of the nozzles are correlated to regions of the dot-pattern bitmap image; and
an inspection system for said printed PCB images uses said simulated inkjet-printed image to identify faults in the printed PCB image, and to determine which nozzles are associated with the locations of identified faults on the printed PCB image in accordance with the correlation between the nozzles and the dot-pattern bitmap image.

14. The method of claim 13, wherein said inspection system identifies faults in the printed PCB image by comparing the simulated inkjet-printed image to the printed PCB image.

15. A non-transient computer readable medium comprising instructions specifying the method of claim 1.

16. An inspection method for inspecting a printed circuit board (PCB) printed with an inkjet printer, comprising:
accessing a dot-pattern bitmap image of a printed pattern;
accessing user-provided input parameters including a printer pitch as dots-per-inch (DPI) and a printer droplet size;
using said user-provided input parameters to define a scaling factor for an initialized image;
determining simulated ink droplet locations within the initialized image in accordance with the dot-pattern bitmap image;
defining simulated ink droplets within said initialized image corresponding to the dots of said dot-pattern bitmap image, each simulated ink droplet having a circular pattern and a common intensity;
mapping the initialized image to the dot-pattern bitmap image in accordance with said scaling factor;
applying an intensity smoothing filter to said circular patterns to produce a smooth initialized image;
binarizing the intensity of said smooth initialized image to produce a simulated inkjet-printed image;
comparing the simulated inkjet-printed image to the printed PCB to generate a distortion map of aberrations.

17. The method of claim 16, wherein:
said inkjet printer contains a set of nozzles, the output of said nozzles being correlated to regions of the dot-pattern bitmap image; and
determining which nozzles are associated with the locations of identified faults on the printed PCB in accordance with the correlation between the nozzles and the dot-pattern bitmap image.

18. The method of claim 17, wherein:
the circular patterns of simulated ink droplets that correspond to adjacent dots of said dot-pattern bitmap overlap each other and have center points offset from each other;
each dot of the dot-pattern bitmap is mapped to the center point of its corresponding simulated droplet location.

19. The method of claim 16, wherein all of said circular patterns have an ideal circular shape of the same size.

20. The method of claim 16, wherein binarizing the intensity of said smooth initialized image includes:
responsive to an intensity value of a pixel being greater than a threshold value, assigning a minimum intensity value to the pixel; and
responsive to an intensity value of a pixel being less than the threshold value, assigning a maximum intensity value to the pixel.

* * * * *